Patented Sept. 28, 1943

2,330,217

UNITED STATES PATENT OFFICE 2,330,217

MANUFACTURE OF THE PHENOL-ALDEHYDE TYPE OF RESINS

James V. Hunn, Chicago, Ill., assignor to The Sherwin-Williams Company, Cleveland, Ohio, a corporation of Ohio No Drawing. Application July 22, 1940, Serial No. 346,805

14 Claims. (Cl. 260—51)

The present invention relates generally to the manufacture of the phenol-aldehyde type of resins, and particularly to such resins which are of the oil-soluble type, whereby they may be used in coating compositions such as varnishes, enamels, paints, inks, and the like.

Phenol-aldehyde resins may be made with acid catalysts or with alkaline catalysts. Difficulties have been encountered heretofore in the use of acid catalysts, in that the phenolic substance, initially used or formed early in the process, does not dissolve in the formaldehyde sufficiently or adequately throughout the intended reaction, to effect the desired product. Thus, in the case of the lower phenols, the water solubility at 15° C. in 100 parts of water is:

| | Parts |
|---|---|
| Phenol | 8.2 |
| O-cresol | 2.5 |
| M-cresol | 0.5 |
| P-cresol | 1.8 |

However, when about 1% of acid (based on the phenol) is present with a resin-forming quantity of formalin (about 37½% formaldehyde solution in water) the phenol and cresol dissolve in the mixture. This might seem to be conducive to proper reaction, but it has been found that as formaldehyde is used up in reacting, leaving water, the residual materials including any phenolic residue and the less soluble low-molecular-weight polymers of the reaction, cannot remain dissolved, and precipitate out. The precipitation slows the reaction to an impractical speed.

The foregoing may be avoided by using excess formalin to provide solvent, but this is uneconomical, and further makes it difficult to control the end point, and the final ratio of formaldehyde to the phenol entering the resin formulation.

Heretofore when such difficulties have been encountered they have been partially overcome by the use of large amounts of strong mineral acids, and even high pressures to secure suitable temperatures. This is especially true in the case of higher phenols such as from butyl phenol to octyl phenol. As much as 10% of strong mineral acid has been employed for effecting reaction of the higher phenols with formalin, and high temperatures in autoclaves have been used to aid the reaction. In such cases there is no time at which all the phenol is in solution. Long-time reactions, for example 8 to 10 hours for butyl phenol, and 24 hours for octyl phenol, are necessary.

Such circumstances have led to the conclusion that the higher phenols are less active, chemically to combine with formaldehyde with an acid catalyst, than are the lower homologs such as phenol and the cresols. Consequently, the bulk of resins made heretofore with the higher phenols has been made with alkaline catalysts which form the phenate salts for use in the reaction.

The present invention is based upon certain discoveries which limit the conclusion that the higher phenols are less reactive. By the present invention not only the lower phenols, but the higher ones, are made readily to react with formalin, at low concentration of acid catalyst, such as about 1%, in a short-time reaction, and without use of autoclaves, producing high grade resins, which may be recovered as of the oil-soluble type suitable for coating compositions. Not only does the invention permit use of strong mineral acids at low concentration, but it also permits dispensing with the strong mineral acids in favor of weaker mineral acids, and organic acids, all of which favor the high quality of the resins.

It is an object of the invention to facilitate reactive contact between ingredients subject to resin-forming reaction resulting between a phenol and aqueous formaldehyde in the presence of a small quantity of acid catalyst.

Another object of the invention is to condense a phenol and aqueous formaldehyde with a small amount of organic or mineral acid catalyst in the presence of a small quantity of wetting agent.

A particular object of the invention is to provide improved oil-soluble resins of the phenol-aldehyde type with acid catalyst in small quantity.

Another object of the invention is to use a wetting agent having a sulfo group for the acid-catalysis of formalin and an alkyl phenol having at least 4 carbon atoms in the alkyl group, to produce improved high-melting resins, and to control the reaction to produce oil-soluble type resins.

Various other and ancillary objects and advantages of the invention will become apparent from the following description and explanation of the invention.

Briefly, the invention is based upon the discovery that the higher phenols, such as from butyl through octyl, and higher, are far more reactive with formalin than heretofore supposed. This is also true of phenol, the cresols, and other lower phenol homologs. The difficulty heretofore has been a lack of reactive contact between the phenol, or its early reaction products, and the formalin solution. For example, using a high alkyl phenol in formalin at 200° to 210° F., some of the phenol is dissolved, and the rest remains molten, but the amount dissolved is so slight that it has been considered heretofore that alkyl phenols having four or more carbon atoms in the alkyl group are practically insoluble in hot formalin, and hence not practically reactive. This condition has heretofore made it difficult to effect a condensation to form resin, where small amounts of acid catalyst are present.

According to the present invention a small amount of so-called wetting agent is effective to make reactive contact between the melted phenol and the formalin, whereby a rapid and clean resin-forming reaction is permitted with small amounts of acid catalyst. The invention has its greatest advantage for those phenols which are substantially insoluble in hot formalin, beginning with the four-carbon alkyl phenols. Incidentally oil-solubility in alkyl-phenol resins is generally limited to those from alkyl phenols having four or more carbon atoms in the alkyl group. Consequently, for the preferred purpose of the present invention of making oil-soluble resin for coating compositions, the disclosure is directed more especially to examples producing such, without intent to limit the invention.

Where the invention in its broader aspects is applied to phenol and cresols, the aspect is somewhat different. The wetting agent does not function to make reactive contact with the phenol, but rather with the above-mentioned low-molecular weight polymers which precipitate and carry phenolic reactant out of solution. In such cases, the prior art procedure of using excess of formalin to function as solvent, may be dispensed with. The same advantage in avoiding excess formalin is also obtained in the case of butyl and higher alkyl phenols. Thus, where the prior art, using pressure vessels, and desiring the use of 0.8 to 1.0 mole of formaldehyde for one mole of phenol, calls for up to 1.5 moles of formalin, using excess formalin as solvent makes more difficult a control of the actual amount of formalin chemically employed.

Another objection to prior art resins is their low molecular weight, indicated by melting points below 210° F. Unless specified otherwise, melting point temperatures are given herein as obtained by the ball and ring method. According to the present invention high-molecular weight resins may be made. Thus, in the case of butyl phenol, a resin melting at 284° F. and higher may be obtained. This may be made with atmospheric pressure reactions, using less than 1 mole of formaldehyde to 1 mole of butyl phenol. The melting point referred to is of course for the oil-soluble resins. The process permits carrying the reaction further to produce higher-melting point resins of poor or no solubility in oil.

In general, the preferred manner of carrying out the invention, consists in heating at a temperature in the range from 180° to 205° F., a mixture of the alkyl phenol, a small quantity of mineral or organic acid catalyst, and a trace of a suitable wetting agent, later described. This is carried on with agitation until a thick creamy emulsion is obtained, whereupon the heating is increased to distill off water in the mass, leaving resin. The distillation must not begin too early, since formaldehyde will be removed, and a different product result which gives no solid resin, or a low-melting resin will be produced, of low yield. The distillation must not begin too late, or the residue near the end of distillation will be too thick to permit stirring. The resin will become so high-melting while the temperature is at 210° to 250° F. that stirring will be difficult or impossible.

The practical preferred procedure is to distill when substantially all the formalin is tied up in the product, when the resin is fluid for easy stirring at 210° F. and later, when at a maximum temperature in the range from 275° to 310° F., whereby the resin, melting at 240° to 276° F., will flow readily from the reaction vessel by air-blowing with a pressure of 5 to 20 pounds. Where the resin is higher melting, as at 284° F., or higher, as in using formaldehyde in higher ratio than 1 to 1, other means to remove it from the vessel may be used.

It is also pointed out that highly efficient agitation in the first stage of reaction is essential to shortening the time. Wide changes in time to arrive at the creamy stage may be produced by varying the agitation. This is an obvious relation of cause and effect, considering that the reaction takes place in an agitated mixture of two liquid phases. Hence, it follows that the time limitations given in the examples below are variable as agitation varies. In order to introduce discussion of the wetting agent and its importance to the present invention, an example is given as a basis for explanation.

EXAMPLE 1

|  | Grams |
|---|---|
| Tertiary butyl phenol | 1050 (1 mole) |
| Formalin (37½%) | 525 (0.93 mole) |
| Oxalic acid | 5 |
| Wetting agent (Aerosol O. T.) 100% | 2 |

Place all the materials into a 5-liter three-necked flask fitted with an efficient stirrer, thermometer, and reflux condenser. Agitate continuously. Heat to 185° to 190° F. in 30 minutes. At this point an exothermic reaction may raise the temperature. Add heat to attain 205° to 210° F. and hold for appearance of a thick creamy mass, which will take place in about 45 minutes. Set the apparatus for distillation, and heat to 300° F. At about 260° to 275° F. an exothermic reaction will be observed. Hold the temperature at 290° to 300° F. until the resin has a melting point of about 235° F. on Parr melting point bar (Parr Instrument Company, Moline, Illinois). The yield of pale resin is 1100 to 1115 grams. The ball and ring melting point is about 275° F.

DISCUSSION

As the water is distilled off, the temperature rises, the water being more and more slowly removed, and when sufficient is removed the temperature rises to about 265° F. At about this point an exothermic reaction raises the temperature to about 300° F. Taking samples of resin from such a mass in progress as described, it will be found that the resin removed shortly after 210° F. is soft, sticky and opaque. As the temperature rises to about 260° F., the samples progressively clear up and harden slowly. When the exothermic reaction begins, the samples on the melting point bar show progressively increasing melting point. The melting point can be selected up to 284° F. (ball and ring) using the quantities of Example 1 by stopping the reaction. Higher melting point resins may be obtained by increasing the molal ratio of formaldehyde to phenol from less than 1 to 1 (1 to 1.2) to 1.

In one case where the distillation was started too early, formaldehyde being lost, more formaldehyde was added, producing finally a resin melting at 311° F., of unknown ratio of formaldehyde to phenol.

The resin of the present invention is not solely the products of the reaction occurring between the formaldehyde and the phenol. Where the wetting agent is one which does not contain a sulfo group, the exothermic reaction observed at near 265° F. does not take place. It is this reaction which raises the melting point from in the range between 150° and 210° F. to in the range between 240° and 284° F., or higher. Such a wetting agent seems to have initially, at least the function of producing reactive contact between the two liquid phases, and later, at least another function which is in nature catalytic. It is not improbable that it acts catalytically in the first stage also.

The amount of sulfo wetting agent is small, but nevertheless, the distillate is acid to Congo red, and more strongly so after the said exothermic reaction begins. Where metal condenser tubes have been used metal sulfates have been found in the distillate, indicating a decomposition product from the wetting agent. This is more likely to be sulfur trioxide than sulfur dioxide, to produce sulfates, and it is probably that one or both of these nascent gases are produced and act as powerful catalysts for hardening reaction, which is known to follow.

So-called wetting agents having sulfo radicals are of numerous types, and are better known to commerce by their trade names, than by their chemical names, or by their chemical identities.

Aerosol O. T. is made according to U. S. Patent No. 2,028,091, wherein it is described as being a sulfo acid. According to Chemical Abstracts, Decennial Index, Subjects, 1917–1926, the "sulfo" group or radical is $HO_3S-$. Present day handbooks, such as Lange's 1941, follow this system of terminology. As used herein the term "sulfo group" contemplates the free acid radical and its salt wherein "H" of the sulfo radical is substituted by a base, such as sodium as in a sodium sulfonic acid compound.

The following list identifies some of the more common ones, all of which are satisfactory for the present invention.

EXAMPLE 2

|  | Parts by weight |
|---|---|
| Tertiary butyl phenol | 1050 |
| Hydrochloric acid (32%) | 4 |
| Formalin (37½%) | 525 |
| Aerosol O. T. (100%) | 2 |

Use the procedure of Example 1. After 10 minutes at 300° F. the resin has a melting point of 284° F. (ball and ring). Yield 1108 parts. The reaction is fast.

DISCUSSION

The effect of exothermic reactions is more pronounced in larger batches, and it is to be understood that the batch, agitation, and equipment, must be adjusted to obtain the desired result. Where the reaction proceeds too rapidly for easy control the amounts of wetting agent and of acid catalyst may be reduced. Example 2 proceeds very rapidly in laboratory equipment, and such reduction in amounts is indicated for larger scale production.

EXAMPLE 3

In Example 1, change the 5 parts oxalic acid to 6 parts dichloracetic acid. The mass is held at 200° to 205° F. for 2 hours before distillation. The yield is 1106 grams melting at 180° F.

EXAMPLE 4

|  | Parts by weight |
|---|---|
| Crude octyl phenol (73–76% octyl phenol content)[1] | 1670 |
| Oxalic acid | 8 |
| Formalin (37½%) | 450 |
| Aerosol O. T. | 2 |

[1] Contains traces of phenol, mineral spirits B. P. 90° to 135° C., and water.

Vary the procedure of Example 1 as follows: Heat to 184° F. Attain 200° F. in 30 minutes and hold for 1½ to 2 hours. Distill to attain 280° F. in about 1½ hours. Distill slowly to attain 300° to 310° F. Hold until bar melting point is about 160°–165° F. to attain ball and ring melting point of 190° to 205° F. Yield is 1400 parts.

EXAMPLE 5

Aerosol O. S. is used in Example 1 in place of aerosol O. T. (100% non-volatile), with approximately the same results.

EXAMPLE 6

In Example 1 change the wetting agent to 17 grams of Alkanol WXN (37% volatile). Melting

Table 1

| Agent | Class | Manufacturer |
|---|---|---|
| Aerosol O. T. | Dioctyl ester of sodium sulfosuccinic acid. | American Cyanamid Co. |
| Aerosol O. S. | Alkyl aryl sodium sulfonate | Do. |
| Alkanol WXN | Sodium salt of sulfonated hydrocarbons. | E. I. du Pont de Nemours. |
| Nekal BX | Sodium alkyl naphthalene sulfonate | General Dyestuffs, Inc. |
| Neopen SS | Sodium abietene sulfonate | E. I. du Pont de Nemours. |
| Tergitol 08 | Sodium salt of higher primary alkyl sulfate. | Carbide and Carbon Chemicals Corp. |
| Neomerpin N | Alkylated-naphthalene sulfonic acid | E. I. du Pont de Nemours. |
| Acidified Aerosol O. T. | Dioctyl ester of sulfosuccinic acid | (See Example 11). |

The chemical identifications given above are believed to be true and correct designations of the products better known under the trade-mark names given in Table 1. The wetting agent is required in only a small quantity, and in the examples is shown to be much less than 1% based on the phenol.

points of resin were 230° F. (bar) and 265° F. (ball and ring).

EXAMPLE 7

In Example 1, change the 2 parts wetting agent to 4 parts Nekal BX (100% non-volatile). Respective bar and ball-and-ring melting points of the resin are 225° F. and 253° F.

EXAMPLE 8

In Example 1, change the 2 parts wetting agent to 4 parts Neopen S. S. Resin melts at 227° F. (bar) and 253° F. (ball and ring).

EXAMPLE 9

In Example 1, change the 2 parts wetting agent to 16 parts Tergitol 08 (25% non-volatile matter). The time of reaction in each stage is about doubled. Resin melts at 225° F. (bar) and 247° F. (ball and ring).

EXAMPLE 10

In Example 1, change the 2 parts wetting agent to 2.7 parts of Neomerpin N (35% non-volatile). The resin melts at 233° F. (bar) and 273° F. (ball and ring) and is somewhat darker than that of Example 1.

EXAMPLE 11

Acidify aerosol O. T. with dilute hydrochloric acid. Salt out the free sulfo acid and recover. About 2 parts (solid basis) of the wetting agent are substituted in Example 1 as the wetting agent with the same results, showing that the free sulfo acid is as effective as the sulfo acid salt.

EXAMPLE 12

| | Parts by weight |
|---|---|
| Diphenylol propane | 264 |
| Tertiary butyl phenol | 786 |
| Formalin (37½%) | 525 |
| Oxalic acid | 2 |
| Aerosol O. T. (100%) | 2 |

When carried out as grams for parts, in a laboratory flask, with agitation, heat to 185° F. in 25 to 30 minutes, and then attain 210° F. in 10 to 15 minutes. Hold at 208° to 210° F. for a thick cream (about 80 minutes). Place flask in oil bath for heating, and distill. At the beginning a froth develops, making caution necessary to avoid loss by froth passing out of the residue. After froth subsides once it does not occur again. Distill to 320° F. in about 1¾ hours. Hold, if necessary, until bar melting point is 250° F., and remove from the heat to recover the resin. Yield 1113 parts of resin melting at 261° F. (ball and ring).

THE PRODUCT

The resin derived from any of the examples above has the following desirable features:

1. It has excellent durability, as for weathering on a coated product made with a coating composition containing it.
2. It has excellent gas-proofing strength on China-wood oil.
3. With China-wood oil and like drying oil, it has fast drying power.
4. With China-wood oil it has excellent alkali resistance. Oils such as perilla and linseed have much poorer alkali resistance than China-wood oil, and the use of the resins of this invention in such oils greatly improves them in this direction.
5. The resin has performance comparing favorably with more expensive phenolic resins. For example, a well known commercial resin based on p-hydroxy-diphenyl could not be equaled in several desirable respects by resins from alkyl phenols made heretofore by other procedures. The resin of Example 1 has performance in most respects equal or superior to this resin of high repute, at a much lower cost.

The invention in its broadest aspect contemplates the use of wetting agents to improve reactive contact between phenols or their reaction products in formaldehyde solution with a small amount of acid catalyst. It also contemplates specifically the production of oil soluble resins for coating compositions where the phenol used is an alkyl phenol having at least 4 carbon atoms in the alkyl chain, and where the wetting agent has a sulfonic acid group therein.

The invention is not limited to the type of reaction illustrated above, and may be applied in numerous ways. For example, the phenol may be a natural phenolic-reacting material which is present in a material such as wood, where the phenolic substance in situ may be changed to a resin. Cocobola wood is a hard wood useful for knife handles and the like, but objectionable because of a stain apparent on washing and wiping. The wood contains a phenolic reacting substance, such that it may be immersed in a water solution containing formaldehyde, acid catalyst and wetting agent, to form resin in the wood to seal the pores. The following example illustrates.

EXAMPLE 13

This example is taken from my copending application Serial No. 346,804, filed July 22, 1940, which discloses a special embodiment of the invention of the present application. Prepare a bath as follows:

| | Parts by weight |
|---|---|
| Formalin (37½%) | 6000 |
| Aerosol O. T. | 60 |
| Hydrochloric acid (32%) | 120 |

Cocobola wood handles, which are cut down to nearly the desired shape, are immersed in the bath at a temperature of 180° to 205° F. for three hours. Then they are removed and drained. Then they are heated in a ventilated oven at 210° to 220° F. for 4 to 16 hours. Commercially, 4 to 5 hours heating at 220° F. is sufficient.

The resulting handles are easily buffed and polished to a marble-like appearance, and are washable with water which is soapy or alkaline, without injury to the handle, and without raising a stain when handled or wiped. In the process color is extracted from a depth of from 1/64 to 1/16 inch. Resin is formed in the superficial layers to about the same depth, and so formed, it seals the surface against penetration by washing solutions to extract color, resin or other constituents within the wood. By using evacuation procedure on the wood, the penetration may be increased.

It is also to be understood that the wood may be preliminarily impregnated with wetting agent, rather than the same be made a constituent of the bath. It is the presence of the wetting agent at the wood that is important.

Hydrochloric acid is the preferred catalyst because of its volatility, but it is merely one of the known acid catalysts. Where other strong mineral acid catalysts are used, such as phosphoric acid and sulfuric acid, essentially the same concentrations as for hydrochloric acid, are effective. When weaker acid catalysts are used, such as oxalic acid, a stronger concentration, such as 1% to 3% is required.

A formalin bath containing not over 0.6% of hydrochloric acid, and wetting agent, shows an extracting action on cocobola wood which is concurrent with the condensation occurring in the wood. The bath appears to extract some of the phenolic-reacting content of the wood, forming a color and also a solid condensation product in the bath, which may be readily filtered from the bath. When the solid content of the bath becomes too heavy, it may be filtered off, and the colored liquor used again, if necessary, with boosting of its desired constituents. A bath may be considerably spent as to its content of aldehyde, catalyst and wetting agent, before boosting is required.

For example, where a commercial formalin solution is employed, it will show about 35% to 38% formaldehyde by weight. Where this is made up to 0.6% hydrochloric acid for a catalyst, the bath will still give good results until the formaldehyde is as low as 25%, or until the acid is as low as 0.2%. The wetting agent may be renewed in proportion as the aldehyde or the acid is renewed. Excess of acid is feasible up to the point where it injures the wood.

Various modifications of the invention will be apparent to those skilled in the art from the foregoing explanation and examples of the invention as defined in the appended claims.

I claim:

1. The method of producing a resin which comprises reacting an alkyl phenol having at least 4 carbon atoms in the alkyl group and formaldehyde in water solution in the presence of a small amount of acid catalyst and of a small amount of surface active wetting agent at a temperature from 180° to 210° F.

2. The method of producing a resin which comprises reacting an alkyl phenol having at least 4 carbon atoms in the alkyl group and formaldehyde in water solution in the presence of a small amount of mineral acid catalyst and of a small amount of surface active wetting agent at a temperature from 180° to 210° F.

3. The method of producing a resin which comprises reacting an alkyl phenol having at least 4 carbon atoms in the alkyl group and formaldehyde in water solution in the presence of a small amount of organic acid catalyst and of a small amount of surface active wetting agent at a temperature from 180° to 210° F.

4. The method of producing a resin which comprises reacting at a temperature from 180° to 210° F. a liquid mixture having two liquid phases, one phase comprising a phenol which is incompletely soluble in hot formaldehyde, and the other phase comprising water, formaldehyde, a small amount of acid catalyst, and a small amount of surface active wetting agent, the wetting agent facilitating reactive contact between the phases to permit an acid-catalytic reaction between the phenol and formaldehyde to form a resin.

5. The method of producing a resin which comprises reacting at a temperature from 180° to 210° F. a liquid mixture having two liquid phases, one phase comprising a phenol, and the other phase comprising water, formaldehyde, a small amount of acid catalyst, and a small amount of wetting agent having a sulfo group therein, distilling water from the mass after substantial completion of the resin-forming reaction, whereby said distillation raises the temperature of the resin residue, continuing the application of heat to raise the temperature of the resin to a point where the resin solidifies on cooling with a measurable melting point, and recovering resin at a point after the removal of some water by distillation.

6. The method of producing a resin which comprises reacting at a temperature from 180° to 210° F. a liquid mixture having two liquid phases, one phase comprising a phenol, and the other phase comprising water, formaldehyde, a small amount of acid catalyst, and a small amount of wetting agent having a sulfo group therein, distilling water from the mass after substantial completion of the resin-forming reaction, whereby said distillation raises the temperature of the resin residue continuing the application of heat to raise the temperature to a point in the range from 260° to 275° F. at which an exothermic reaction occurs which raises the temperature and the melting point of the resin, and recovering resin at a point after the beginning of said exothermic reaction.

7. The method of producing a resin which comprises reacting at a temperature from 180° to 210° F. a liquid mixture having two liquid phases, one phase comprising a phenol, and the other phase comprising water, formaldehyde, a small amount of acid catalyst, and a small amount of wetting agent having a sulfo group therein, distilling water from the mass after substantial completion of the resin-forming reaction, whereby said distillation raises the temperature of the resin residue continuing the application of heat to raise the temperature to a point in the range from 260° to 275° F. at which an exothermic reaction occurs which raises the temperature and the melting point of the resin, and recovering resin after completion of said exothermic reaction.

8. The method of producing a resin which comprises reacting at a temperature from 180° to 210° F. a liquid mixture having two liquid phases, one phase comprising alkyl phenol having at least 4 carbons in the alkyl group, and the other phase comprising water, formaldehyde, a small quantity of acid catalyst, and a small quantity of wetting agent having a sulfo group therein, distilling water from the mass after substantial completion of the resin-forming reaction, whereby the said distillation raises the temperature of the resin residue continuing the application of heat to raise the temperature to a point in the range from 260° to 275° F. at which an exothermic reaction occurs which raises the temperature and the melting point of the resin residue, and recovering the resin after initiation of said exothermic reaction.

9. The method of producing a resin which comprises reacting at a temperature from 180° to 210° F. a liquid mixture having two liquid phases, one phase comprising one mole of alkyl phenol having at least 4 carbons in the alkyl group, and the other phase comprising water, less than 1 mole of formaldehyde, a small quantity of acid catalyst, and a small quantity of wetting agent having a sulfo group therein, distilling water from the mass after substantial completion of the resin-forming reaction, whereby the said distillation raises the temperature of the resin residue continuing the application of heat to raise the temperature to a point in the range from 260° to 275° F. at which an exothermic reaction occurs which raises the temperature and the melting point of the resin residue, and recovering the resin after initiation of said exothermic reaction.

10. The method of producing a resin which comprises reacting at a temperature from 180° to 210° F. a liquid mixture having two liquid phases, one phase comprising one mole of alkyl phenol having at least 4 carbons in the alkyl group, and the other phase comprising water, from less than 1 to 1.2 moles of formaldehyde, a small quantity of acid catalyst, and a small quantity of wetting agent having a sulfo group therein, distilling water from the mass after substantial completion of the resin-forming reaction, whereby the said distillation raises the temperature of the resin residue continuing the application of heat to raise the temperature to a point in the range from 260° to 275° F. at which an exothermic reaction occurs which raises the temperature and the melting point of the resin residue, and recovering the resin after initiation of said exothermic reaction.

11. The method of producing a resin which comprises reacting at a temperature from 180° to 210° F. a liquid mixture having two liquid phases, one phase comprising butyl phenol, and the other phase comprising water, formaldehyde, a small quantity of acid catalyst, and a small quantity of wetting agent having a sulfo group therein, distilling water from the mass after substantial completion of the resin-forming reaction, whereby the said distillation raises the temperature of the resin residue continuing the application of heat to raise the temperature to a point in the range from 260° to 275° F. at which an exothermic reaction occurs which raises the temperature and the melting point of the resin residue, and recovering the resin after initiation of said exothermic reaction.

12. The method of producing a resin which comprises reacting at a temperature from 180° to 210° F. a liquid mixture having two liquid phases, one phase comprising octyl phenol, and the other phase comprising water, formaldehyde, a small quantity of acid catalyst, and a small quantity of wetting agent having a sulfo group therein, distilling water from the mass after substantial completion of the resin-forming reaction, whereby the said distillation raises the temperature of the resin residue continuing the application of heat to raise the temperature to a point in the range from 260° to 275° F. at which an exothermic reaction occurs which raises the temperature and the melting point of the resin residue, and recovering the resin after initiation of said exothermic reaction.

13. The method of producing a resin which comprises heating at a temperature from 180° to 210° F. at atmospheric pressure a liquid mixture having two liquid phases, one phase comprising alkyl phenol having at least 4 carbons in the alkyl group, and the other phase comprising water, formaldehyde, a small quantity of acid catalyst, and a small quantity of wetting agent having a sulfo group therein, distilling water from the mass after substantial completion of the resin-forming reaction, whereby the said distillation raises the temperature of the resin residue continuing the application of heat to raise the temperature to a point in the range from 260° to 275° F. at which an exothermic reaction occurs which raises the temperature and the melting point of the resin residue, and recovering the resin after initiation of said exothermic reaction.

14. An acid-catalyzed resin of the phenol-aldehyde type derived from alkyl phenol having at least 4 carbon atoms in the alkyl group and from formaldehyde in the proportion of about 1 to 1.2 moles of formaldehyde to 1 mole of phenol, said resin being a product of an exothermic reaction beginning at a temperature within the range of 260° to 275° F. of an acid catalyzed condensation product of the said phenol and the said formaldehyde at a temperature in the range of 180° to 210° F. in an aqueous medium and in the presence of a wetting agent containing a sulfo group, said agent being present during the initial condensation and upon attaining the temperature at which the exothermic reaction begins.

JAMES V. HUNN.